Patented Dec. 8, 1925.

1,564,394

UNITED STATES PATENT OFFICE.

ROBERT H. YOUNGMAN, OF PITTSBURGH, PENNSYLVANIA, ASSIGNOR TO HARBISON-WALKER REFRACTORIES COMPANY, OF PITTSBURGH, PENNSYLVANIA, A CORPORATION OF PENNSYLVANIA.

UNBURNED REFRACTORY BRICK.

No Drawing. Application filed February 29, 1924. Serial No. 696,105.

*To all whom it may concern:*

Be it known that I, ROBERT H. YOUNGMAN, a citizen of the United States, and a resident of Pittsburgh, in the county of Allegheny and State of Pennsylvania, have invented a new and useful Improvement in Unburned Refractory Bricks, of which the following is a specification.

This invention relates to unburned refractory bricks. The objects of the invention are to provide a brick of highly refractory, and preferably neutral or basic, materials, which will have sufficient structural strength without burning to withstand shipment and handling preliminarily to being built into furnace walls, or like structure. Another object is to provide such brick of a composition and structure that will not crumble or decompose upon exposure to the atmosphere for a period of storage without burning, and which will not weaken or disintegrate upon the application of heat. Another object is to provide bricks formed of such highly refractory materials as calcined magnesite and chrome ore, unburned, and yet of such structural strength that they may be handled, stored and shipped without breakage, disintegration, or other deterioration. Another object is to provide an unburned refractory brick comprising a large proportion of calcined magnesite of sufficient strength to stand up under shipping, handling and storing.

Bricks have heretofore been made of basic refractory materials such as calcined magnesite, but usually such bricks in an unburned state have very little structural strength, being subject to excessive breakage in handling, shipping and storing. Also such unburned bricks have a tendency to adsorb moisture and $CO_2$ from the atmosphere when stored for a material length of time, and to gradually deteriorate. Furthermore, when heat is applied as for example after such unburned bricks are built into a furnace, the bricks frequently disintegrate. These difficulties are overcome by thoroughly burning such bricks at a high temperature after they have been molded, and after this they may be packed, stored, or shipped. But this brick-burning process is expensive, requiring a large amount of fuel, labor of firing, handling and rehandling, and increased breakage. The burning is an extra expense because the magnesite must have been dead-burned before forming it into bricks. Bricks cannot be made of uncalcined magnesite because raw magnesite loses nearly 50% of its weight in being calcined, with a resultant enormous shrinkage.

I have discovered that unburned bricks may be made of highly refractory material, and particularly calcined magnesite, molded to shape, and kept indefinitely without deterioration, and with sufficient structural strength to withstand any ordinary wear and tear of packing and shipping, and without any of the disadvantages incident to unburned refractory bricks as heretofore made.

The mixture I find most satisfctory is about 60% of calcined magnesite, about 35% chrome ore, and about 5% dry sodium silicate. This is ground to a fine condition, though not necessarily to a powder. The materials may be ground either separately and then mixed together, or they may be all ground at one operation, which also mixes them. Sufficient water is added to render the mass plastic enough for molding or pressing into bricks, which is done by the usual methods, either by hand molding or in one of the various forms of power presses. After the bricks are formed they are dried either at atmospheric temperature, or in a tunnel or other drying apparatus using heated air at a temperature of from 150° to 400° F.

Magnesite and sodium silicate are basic in character while chrome ore is neutral. Consequently a basic brick is produced by the mixture stated. Chrome and magnesite may be used in contact in a metallurgical furnace without reaction on each other and without reaction on the metal other than that of their separate presence. In fact it is a good practice in the wall of a furnace to separate magnesite brick from silica brick by a layer of chrome brick to prevent reaction between the acid and basic refractories. Calcined magnesite even with sodium silicate does not bond strongly enough for making bricks capable of being shipped and stored without breakage. But chrome ore and sodium silicate combine to form a very hard structure of great inherent strength and density. In its plastic condition this latter combination may be molded or otherwise formed into bricks of quite accurate proportions and shapes, and upon hardening these shapes become strong enough to withstand any strains that would ordinarily be applied to bricks in storing, shipping, handling and building into furnace structure. They do not adsorb moisture or deteriorate in any way from storage and exposure to atmosphere. The calcined magnesite mixed in with the chrome ore and sodium silicate is carried, as it were, in a matrix formed by the combination or bond of chrome ore and sodium silicate and consequently the three ingredients form an exceedingly strong, hard, dense structure, not requiring burning to preserve it against atmospheric deterioration and against injury in handling, or to give it great structural strength and permanency. Refractory brick made of these three materials may be completely manufactured by a brickmaker, without burning, and may be delivered to the ultimate user without loss from breakage, and without the very large expense of preliminary burning. When put into use these unburned bricks behave much like a burned magnesite brick, but with less tendency to crack or spall.

It is to be understood that the foregoing formula is the preferred one, but that the proportions of the ingredients may be varied. The sodium silicate may be used in liquid form. The quantity of this binding material may also be considerably varied, say from 3 to 10%. But if too much sodium silicate is used the fusibility of the brick will be lowered more than is desirable.

I claim—

1. An unburned refractory brick composed of calcined magnesite, chrome ore, and sodium silicate.

2. An unburned refractory brick comprising principally calcined magnesite, bonded with a combination of chrome ore and sodium silicate.

3. An unburned refractory brick consisting of calcined magnesite and chrome ore in proportions of approximately 3 to 2, and a relatively very small proportion of sodium silicate.

4. An unburned refractory brick comprising calcined magnesite and chrome ore, mixed with a binder of 3 to 10% of sodium silicate.

5. An unburned refractory brick composed of about 60% of calcined magnesite, about 35% of chrome ore, and about 5% of sodium silicate.

In testimony whereof, I sign my name.

ROBERT H. YOUNGMAN.